United States Patent [19]

Carcey

[11] 4,216,017
[45] Aug. 5, 1980

[54] METHOD AND EQUIPMENT FOR SINTERING UNDER PRESSURE

[75] Inventor: Jacques P. Carcey, Charavines, France

[73] Assignee: Commissariat a l'Energie Atomique, Paris, France

[21] Appl. No.: 943,761

[22] Filed: Sep. 20, 1978

Related U.S. Application Data

[63] Continuation of Ser. No. 660,041, Feb. 23, 1976, abandoned.

[30] Foreign Application Priority Data

Feb. 27, 1975 [FR] France .............................. 75 061690

[51] Int. Cl.² .......................... B22F 3/16; B28B 3/00
[52] U.S. Cl. ................................. 75/208 R; 75/200;
75/211; 75/226; 264/111; 264/113; 264/120;
264/125; 425/78
[58] Field of Search ............... 75/226, 211, 208 R,
75/200; 425/405 H, 78; 264/111, 120, 125, 113

[56] References Cited

U.S. PATENT DOCUMENTS

| Re. 28,301 | 1/1975 | Havel | 75/226 X |
|---|---|---|---|
| 3,419,935 | 1/1969 | Pfeiler | 75/226 X |
| 3,671,230 | 6/1972 | Smythe et al. | 75/226 X |
| 3,970,517 | 7/1976 | Van Nederveen | 75/226 X |
| 4,094,709 | 6/1978 | Rozmus | 75/226 X |
| 4,142,888 | 3/1979 | Rozmus | 75/226 X |

*Primary Examiner*—Richard E. Schafer
*Attorney, Agent, or Firm*—Frishauf, Holtz, Goodman & Woodward

[57] ABSTRACT

The materials to be sintered are placed in a deformable container which is in turn placed within a non-deformable treatment module equipped with heating means. The temperature of the container is increased under constant pressure until commencement of sintering. The temperature and pressure of the materials are increased simultaneously until sintering conditions are achieved, then maintained at a level stage for a predetermined period of time. The pressure is then reduced to the normal value while maintaining the temperature. The temperature is finally reduced to the room-temperature value.

6 Claims, 5 Drawing Figures

METHOD AND EQUIPMENT FOR SINTERING UNDER PRESSURE

This is a continuation of application Ser. No. 660,041, filed Feb. 23, 1976, now abandoned.

This invention relates to a metod of sintering under pressure for obtaining ceramic materials, refractory materials or homogeneous metallic materials, of either uniform or composite structure.

It is seldom possible by known methods of sintering such materials to get beyond batch or unit manufacture of small samples with day-to-day tie-up of large and costly equipment for the entire operation.

Sintering under axial pressure in a nondeformable die between two punches has already undergone many changes which have tended to reduce the disadvantages of the process. Severe limitations in diameter still exist, however, for a number of reasons among which can be mentioned the following:

1. Irrespective of the type of insulation employed between the product and the die, adhesion to the walls and undesirable consolidations prevent the pistons from coming together. In powder metallurgy, this phenomenon is well-known in cold isostatic pressing and is accentuated at elevated temperatures. The product has a tendency to engage in the clearance space between the punch and the die and this also gives rise to an excessive increase in the radial component at the expense both of the real pressure applied to the product and the homogeneity of this latter. These are contributory factors in the short service life of conventional tool equipment which usually offers low resistance to applied stresses.

2. In any device of axial design and of revolution, an increase in diameter of the working zone results in displacement of the heating elements to a more distant location and in pistons of larger size which are conducive to axial cooling. This drawback cannot be overcome in practice by the use of heating dies. The use of short cycles accentuates this tendency since the time required to achieve homogenization of temperature is not attained.

Products which are treated under conditions of inhomogeneity of pressure and temperature have irregular structures and densities; during cooling, these are liable to introduce stresses which are detrimental to the practical utilization of the materials. In contrast to metallic products of higher plasticity in which the coefficient of expansion is little affected by the variation in porosity, ceramics or refractory materials in fact exhibit high sensitivity to inhomogeneities in density and in porosity at high density, such fragility being comparable with that which arises from thermal shock and temperature gradients.

3. The difficulties involved in providing chemical and mechanical insulation between the product to be densified and tool equipment are also liable to increase the "fragilization" of the product. Surface adhesions of the order of 1 per cent are sufficient to induce stresses in dense products which have a high degree of hardness, especially at the time of cooling under the action of dimensional variations of the molds.

The use of sintering under pressure in deformable dies offers an advantage in that the movement of closure of the pistons is no longer hindered and the pressure applied to the products can be transmitted almost entirely. But the application of this process is conventional equipment, furnaces and presses also has the effect of limiting their diameter by reason of the lack of uniformity of temperature. Moreover, the chemical and mechanical insulations remain insufficient and involve difficulty in product withdrawal.

The present invention overcomes the disadvantages of methods of the prior art by permitting the fabrication of ceramic materials, refractory materials or homogeneous metallic materials having a uniform or composite structure and dimensions which can attain and exceed one square meter.

This method essentially comprises the following steps:

placing of the materials to be sintered in a deformable composite container having a pair of opposite substantially parallel walls and a plurality of lateral members connecting said parallel walls, said container being capable of being deformed, placing of said container within a nondeformable treatment module provided with heating means, increasing the temperature of said container and the materials therein while pressing said parallel walls of said container towards each other at constant pressure while said container is permitted to expand in directions parallel to said parallel walls by deformation of said container until commencement of sintering of said material, simultaneously increasing the temperature of and the unidirectionally applied pressure on said container until sintering conditions are fully established in said material, maintaining of a constant temperature in and unidirectionally applied pressure on said container for a predetermined period of time, reducing the pressure to normal pressure while maintaining the temperature, and then reducing the temperature to room temperature.

This method of sintering makes it possible to obtain either uniform materials, that is to say materials constituted by a single element or a compound or composite materials comprising a plurality of elements or compounds presented in a very wide range of different forms such as wires, powders, strips and so forth.

The use of the container in accordance with the method of the invention is required for a number of reasons:

firstly it permits preconditioning of materials for easy handling, storage prior to treatment and final recovery after treatment without being subjected to stresses, it achieves chemical and mechanical insulation of materials at the time of sintering, if necessary, it produces a controlled atmosphere around the materials when means are provided for the introduction of said atmosphere, the materials are consolidated laterally until commencement of the sintering process, thus permitting elimination of initial inhomogeneities resulting from cold compression.

In order to carry out these different functions, the container must have a composite structure and necessarily has three independent portions forming a casing, namely a lateral wall made up of several elements, a bottom wall and a top closure. The geometry of said container determines the geometry of the end product. The powder which is placed within the container can be insulated from this latter by means of chemical insulating materials (in order to prevent undesirable reactions between the powder and the container) and by means of mechanical insulating materials (in order to permit free interaction of the materials which are present).

For the fabrication of uniform sintered materials, namely materials having a base consisting of a single constituent, the container can be filled either with a slip or with a powder which may or may not be granular. Densification by means of vibrations can be carried out at the same time as the filling operation.

For the fabrication of composite sintered materials comprising a plurality of constituents, the materials are placed in the container by superposing the constituents in a suitable order.

In the second step of the method, the container which is filled with materials is placed in a nondeformable treatment module equipped with integrated heating means.

Chemical and mechanical insulation of the container with respect to the treatment module is performed in the manner which was described earlier in the case of insulation of the materials with respect to the container. In both cases, this insulation will be carried out for example by means of powder such as stabilized zirconia or by means of a metal plate.

The treatment module is divided into two sections between which the container is intended to be placed. Each section is equipped with resistance-type heating means or induction heating elements. In order to prevent overheating of the pistons, provision is made for heat-insulating elements which are capable of transmitting the pressure. Said elements may be completed if necessary by external cooling means.

Finally, the treatment module can advantageously comprise means such as bellows seals or sand seals, for example, which are intended to produce a controlled atmosphere within the working zone.

The treatment in accordance with the method comprises in particular a temperature build-up under constant pressure until commencement of the sintering operation. The pressure employed during this stage is of a low order and does not call for a high-pressure press as in the following stages. In order to avoid the need for tying up a high-pressure press (i.e. making it unavailable for any other use) during all the stages of the process and to reserve the use of the press only when it is necessary, the treatment module is accordingly placed in a low-pressure press in this stage. An alternative expedient consists in providing means for application of stress such as springs or jacks which are rigidly fixed to the treatment module. A high-pressure press is used solely during the treatment stages for which it is essential facilitates industrial production and that press is free for operation on other articles or other processes at all other times.

One of the dimensions in plan of the treatment module is practically unlimited, which means in other words that it can be given a very considerable length. In point of fact, the presses which are at present available are not well suited to the application of sintering processes.

The final stages of the process do not give rise to any particular difficulties. The rates of increase in temperature and in pressure, the level stages of temperature and pressure, the rates of decrease in temperature and pressure will be chosen as a function of the materials employed.

The present invention is also directed to a novel press in which the working zone is of large size and in which one dimension can attain several meters.

The press in accordance with the invention is essentially formed by a bank of modular elements assembled together in the form of side-plates, each modular element being constituted by a rigid frame which surrounds a working zone, by at least one means for application of pressure, at least one supply of said pressure-application means for obtaining a uniform pressure within all the modular elements and by stiffening elements associated with said pressure-application means.

In respect of a given width, the press which is thus constituted by parallelepipedal elements assembled together in the form of side-plates permits an extension to any desired length simply by mounting modular elements in juxtaposed relation.

The pressure-application means which are constituted for example by hydraulic jacks are advantageously connected to each other and supplied by an oleopneumatic transformer.

The stiffening members can be constituted by sheet metal members, plates, rails and the like. Said members ensure uniform transmission of pressure over the entire surface of the working zone which is obtained by juxtaposition of modular elements.

The stiffening members can be either stationary or movable in the horizontal direction, the alternative just mentioned being conducive to easier utilization.

In accordance with a preferential form of construction of said press, the rigid frame is not constituted by a single member but by two rigid side-plates of smaller thickness which are assembled together by means of spacer members.

This alternative form of construction has the advantage of great simplicity as well as lower capital cost.

A number of examples of application of the method and equipment for sintering under pressure in accordance with the invention will be given below without any limitation being implied. The practical arrangements which will be described in connection with these examples must be considered as forming part of the invention, it being understood that any equivalent arrangements could equally well be employed without thereby departing from the scope of the invention.

Reference will be made to the accompanying drawings which illustrate only the elements required for a proper understanding of the invention, identical reference numerals being assigned to corresponding elements in the different figures, and wherein.

Figure 1:
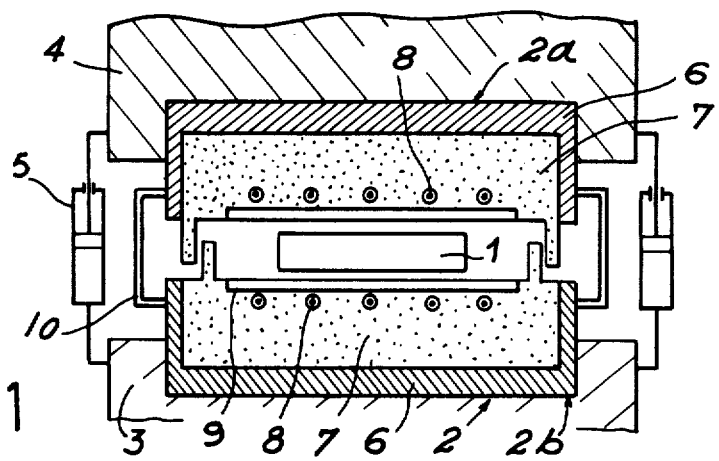
FIG. 1 is a sectional view of a high-pressure press in which there has been placed a treatment module fitted with a container.

As shown in FIG. 1, the container 1 is filled with material and is placed within a treatment module 2. The assembly consisting of container and module is placed between the bottom and top plates 3 and 4 of a high-pressure press. Pressure is applied to the complete assembly by means of the jack 5.

In accordance with the invention, the treatment module is divided into two sections 2a and 2b. These two sections are formed by U-section metallic members 6 which ensure rigidity of the treatment module. A packing 7 of refractory concrete which is placed within the members 6 ensures both pressure transmission to the container 1 and thermal insulation of the plates 3 and 4 when voltage is applied to the heating resistors 8. Said resistors 8 are intended to bring the container 1 to the sintering temperature by means of conductive plates 9. A metallic seal 10 constituted by a bellows element makes it possible to operate in a controlled atmosphere.

Figure 2:
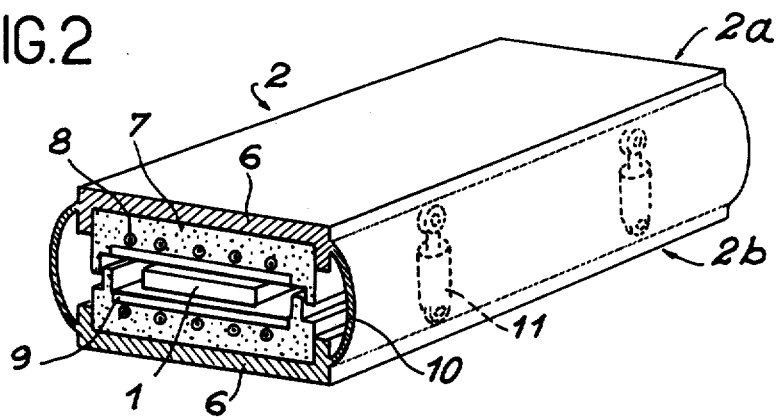
FIG. 2 is a sectional view in perspective showing a treatment module into which a container has been introduced.

FIG. 2 shows a portion of a treatment module which is in readiness. The pressure is maintained constant by the jacks 11 whilst the temperature is increased by means of the heating resistors 8. This stage of the process takes place away from the high-pressure press, thus making it possible to use this latter for other purposes.

FIG. 3 shows a modular press of the high-pressure type for carrying out the method in accordance with the invention.

Figure 3A:
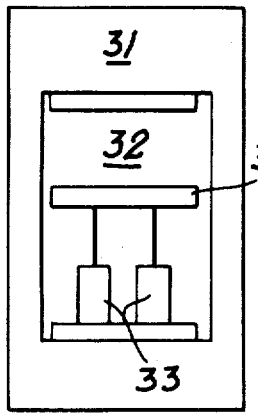
FIG. 3 shows three views of a modular press of the high-pressure type in accordance with the invention.
Figure 3B:
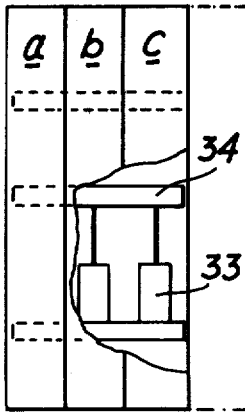
Figure 3C:
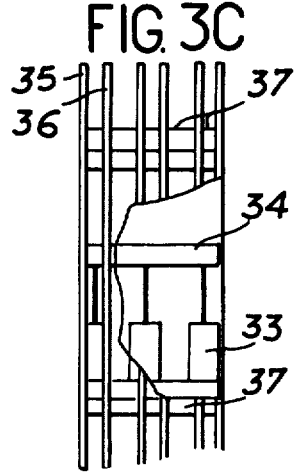

FIG. 3a is a front view of the press showing the first module; FIG. 3b is a profile view of the same press showing the successive modular elements a, b, c, etc.

FIG. 3a shows a front view of a modular element whilst FIG. 3b illustrates a set of modular elements which have been partially cut away and show the positions of the jacks.

A frame 31 having an open central portion for the arrangement of a working zone 32 is shown in FIG. 3a. Two hydraulic jacks 33 which are placed at the lower end of the frame serve to apply the desired pressure. Said two jacks are associated with a stiffening member 34.

There can be seen in FIG. 3b three assembled modular elements (a, b, c). The cutaway portion reveals the jacks 33 which are supplied in parallel by means of pipes (not shown in the figure). The stiffening member 34 ensures a uniform pressure over the entire application surface.

In accordance with a preferential embodiment, the rigid frame of each modular element is constructed by means of rigid side-plates 35 and 36 of small thickness (FIG. 3c) which are assembled together by means of spacer members 37; the bottom spacer member serve as an abutment for the jacks.

EXAMPLE 1

The starting product is a garnet powder consisting of $Gd_3Fe_5O_{12}$ or $Y_3Fe_5O_{12}$ having a mean grain size of the order of 300 Å.

The product is poured in an alcohol slip into a container formed of refractory steel with a top closure and a bottom wall having a thickness of 0.5 mm which are joined to a lateral portion of greater thickness made up of four sections so as to form a volume of 120×200×40 mm. The sections are assembled together by means of wires of the same material. The product is insulated from the container by means of stabilized zirconia in powdered form. The temperature is increased at 200° C./hr up to 900° C. under a stand-by pressure of 36 kg/cm². On commencement of shrinkage, the pressure is increased to 220 kg/cm²/hour up to a level stage of 350 kg/cm² whilst the temperature is increased to 1200° C. at the same rate.

Densification (level stage) is obtained in one hour. Decompression is carried out at 400 kg/cm²/hour at constant temperature (1200° C.). Reduction to room temperature is then carried out at 300° C./hour.

The products obtained have a density which is higher than 99.8% of the theoretical density. They have the appearance of thin transparent strips having a thickness of 20μ and a uniform particle size which is smaller than 2.7μ. These products can be employed in the fabrication of magneto-optical memories.

EXAMPLE 2

The starting material is titanium zirconate of lead. It is placed within a container having a bottom wall and top closure formed by a sheet of 18/8 steel having a thickness of 0.5 mm and lateral faces of baked clay elements. The product is insulated by stabilized zirconia in grains of 0.2 to 0.5 mm which has been precompacted by vibrations. The container is insulated from the work surface also by means of stabilized zirconia. The treatment module is formed in hollow structures of Norton furnace plates of SiC. The heating elements of SiC are fitted within recesses. The complete assembly is subjected to the following treatment cycles: temperature rise from 200° C./hr to 300° C./hr under a stand-by pressure of 40 kg/cm² up to commencement of sintering (940° C.). The pressure is then increased simultaneously with the temperature and attains a level-stage value of 150 kg/cm² and a temperature of 1180° C. This level-stage value is maintained for a period of 30 minutes. Normal pressure is then restored at a rate of 300 kg/cm²/hr followed by the temperature at a rate of 200° C./hr.

The ceramics thus obtained have a density which is higher than 99.8% of theoretical density, a uniform grain-size distribution within the range of 0.5 to 1.2μ.

The piezoelectric characteristics are appreciably higher than conventional values.

I claim:

1. A method for sintering under pressure ceramic materials, refractory materials or homogeneous metallic materials, of either uniform or composite structure, wherein said method comprises the following steps:
   placing the materials to be sintered in a deformable composite container having substantially opposite top and bottom walls and a lateral wall made up of several elements,
   placing said container within a nondeformable treatment module provided with heating means,
   pressing said top and bottom walls towards each other until a predetermined temperature is established,
   increasing the temperature of said container and the materials therein while pressing said top and bottom walls of said container toward each other at constant pressure while said container is free to expand laterally if necessary by deformation of said container until commencement of sintering of said materials,
   simultaneously increasing the temperature of and the pressure applied to press said top and bottom walls until sintering conditions for densification are fully established in said materials,
   maintaining a constant temperature in said container and a constant force pressing said top and bottom walls towards each other for a predetermined period of time,
   reducing the pressure on said container while maintaining the temperature, and then
   reducing the temperature to room temperature.

2. A method for sintering uniform materials according to claim 1, wherein the materials placed in the container are provided in the form of powder and wherein said placing operation is carried out with application of vibrations.

3. A method for sintering uniform materials according to claim 1, wherein the materials placed within the container are provided in the form of slip.

4. A method for sintering uniform materials according to claim 1, wherein the materials placed within the container are provided in the form of granular powder.

5. A method for sintering composite materials according to claim 1, wherein the placing of the materials is carried out by superposition of the constituents.

6. A method for sintering according to claim 1, wherein the step of simultaneously increasing temperature and pressure is performed in a high pressure press into which said treatment module is inserted at the beginning of that step and which was not used for applying pressure in the previous constant pressure step.

* * * * *